United States Patent [19]

Kaurich et al.

[11] Patent Number: 4,796,915
[45] Date of Patent: Jan. 10, 1989

[54] SEAT BELT EXTENDER

[75] Inventors: Michael S. Kaurich, Sterling Heights; Paul E. Rishel, Mt. Clemens, both of Mich.

[73] Assignee: General Motors Corporation, Detroit, Mich.

[21] Appl. No.: 120,363

[22] Filed: Nov. 13, 1987

[51] Int. Cl.⁴ .......................................... B60R 22/18
[52] U.S. Cl. .................................. 280/802; 297/474
[58] Field of Search .............. 280/801, 802, 803, 804, 280/745; 180/270; 297/474

[56] References Cited

U.S. PATENT DOCUMENTS

| | | | |
|---|---|---|---|
| 3,613,819 | 10/1971 | Maloney | 280/802 |
| 3,781,061 | 12/1973 | Walz et al. | 280/802 |
| 3,887,212 | 6/1975 | Weman | 280/802 |
| 3,976,305 | 8/1976 | Fieni | 280/802 |
| 4,082,317 | 4/1978 | Weman | 280/745 |
| 4,175,633 | 11/1979 | Andres et al. | 180/270 |
| 4,416,468 | 11/1983 | Cunningham | 280/802 |
| 4,458,916 | 7/1984 | Yamada et al. | 280/802 |
| 4,600,217 | 7/1986 | Naumann et al. | 280/802 |
| 4,655,476 | 4/1987 | Paludetto | 280/802 |

Primary Examiner—Richard A. Bertsch
Attorney, Agent, or Firm—Charles E. Leahy

[57] ABSTRACT

A seat belt extender for positioning a seat belt being unwound from a seat belt retractor includes two or more multiplastic sleeves telescopically slidable relative one another between retracted and extended positions and having belt passages through which the belt passes from the retractor toward the occupant. A detent mechanism acts between the belt and the endmost of the sleeves to releasably couple the belt and the endmost of the sleeves so that the unwinding and extension of the belt from the retractor causes the belt to carry the endmost sleeve therewith and thereby extend the other sleeve to their extended positions so that the sleeves support the belt at a lifted position relative to the occupant. An additional detent means acts between each pair of adjacent telescoping members to retain the telescoping members at their relative extended positions relative one another and are then releasable to permit the telescoping members to retract relative one another to lower the belt to the close fitting relationship around the occupant when the door is closed and the belt is retracted.

6 Claims, 2 Drawing Sheets

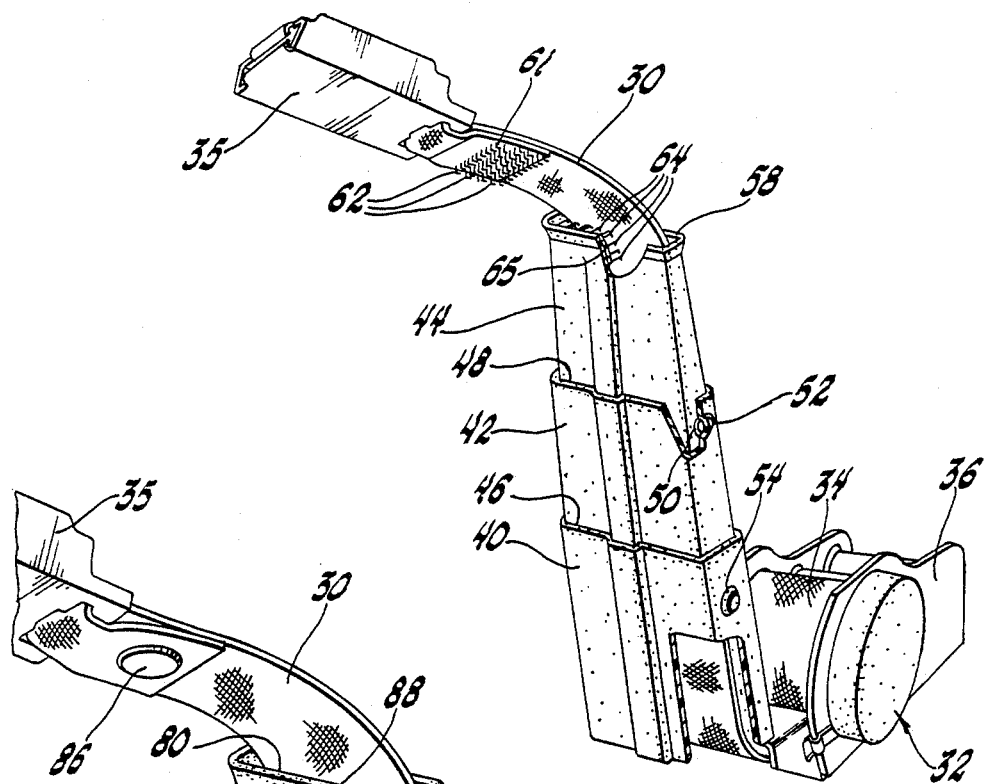
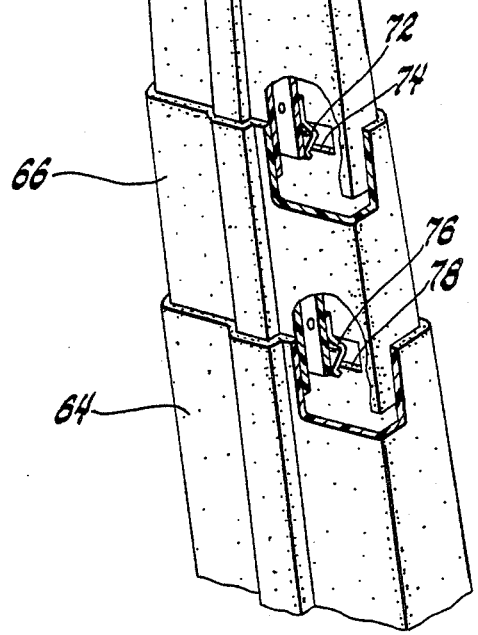

SEAT BELT EXTENDER

The invention relates to a seat belt extender and more particularly to a telescoping sleeve arrangement for lifting a seat belt as the belt is unwound from a retractor.

BACKGROUND OF THE INVENTION

It is well known in motor vehicles to employ a passive seat belt system in which the inboard end of the belt is mounted inboard the seat and the outboard end of the belt is mounted on the door. A retractor is associated with at least one end of the belt and permits the belt to be unwound when the door is opened and retracts the belt to a restraining position about the occupant when the door is closed.

It has been recognized in the prior art that it would be desirable to provide a mechanism for lifting the lap belt upwardly and forwardly away from the occupant when the door is opened to facilitate occupant ingress and egress from the passive restraint system.

To that end prior art patents such as U.S. Pat. No. 4,082,317, to Weman entitled "Safety Belt for Motor Vehicles" have proposed power operated telescoping mechanisms which would lift the belt relative to the seated occupant.

The present invention provides a new and improved seat belt lifter in which a telescoping mechanism is extended automatically by the passage of belt therethrough during belt unwinding to eliminate the need for a powered operating mechanism for extending the telescoping mechanism.

SUMMARY OF THE INVENTION

According to the invention a seat belt extender for positioning a seat belt being unwound from a seat belt retractor includes two or more plastic sleeves telescopically slidable relative one another between retracted and extended positions and having belt passages through which the belt passes from the retractor toward the occupant. A detent mechanism acts between the belt and the endmost of the sleeves to releasably couple the belt and the endmost of the sleeves so that the unwinding and extension of the belt from the retractor causes the belt to carry the endmost sleeve therewith and thereby extend the other sleeve to their extended positions so that the sleeves support the belt at a lifted position relative to the occupant. An additional detent mechanism acts between each pair of adjacent telescoping members to retain the telescoping members at their extended positions relative one another and are then releasable to permit the telescoping members to retract relative one another to lower the belt to the close fitting relationship around the occupant when the door is closed and the belt is retracted.

Accordingly, the object, feature and advantage of the invention resides in the provision of a seat belt extender comprised of tubular telescoping sleeve members having the belt passing therethrough and wherein the unwinding passage of the belt through the sleeves acts to extend the telescoping members to extended positions relative one another.

BRIEF DESCRIPTION OF THE DRAWINGS

These and other features, objects and advantages of the invention will become apparent upon consideration of the following description of the preferred embodiment and the appended drawings in which:

FIG. 2 is an enlarged view of the seat belt extender of FIG. 1 shown with the extender in the extended position and having parts broken away and in section.

FIG. 3 is a view similar to FIG. 2 but showing a second embodiment of the invention.

DESCRIPTION OF THE PREFERRED EMBODIMENT

Figure 1:
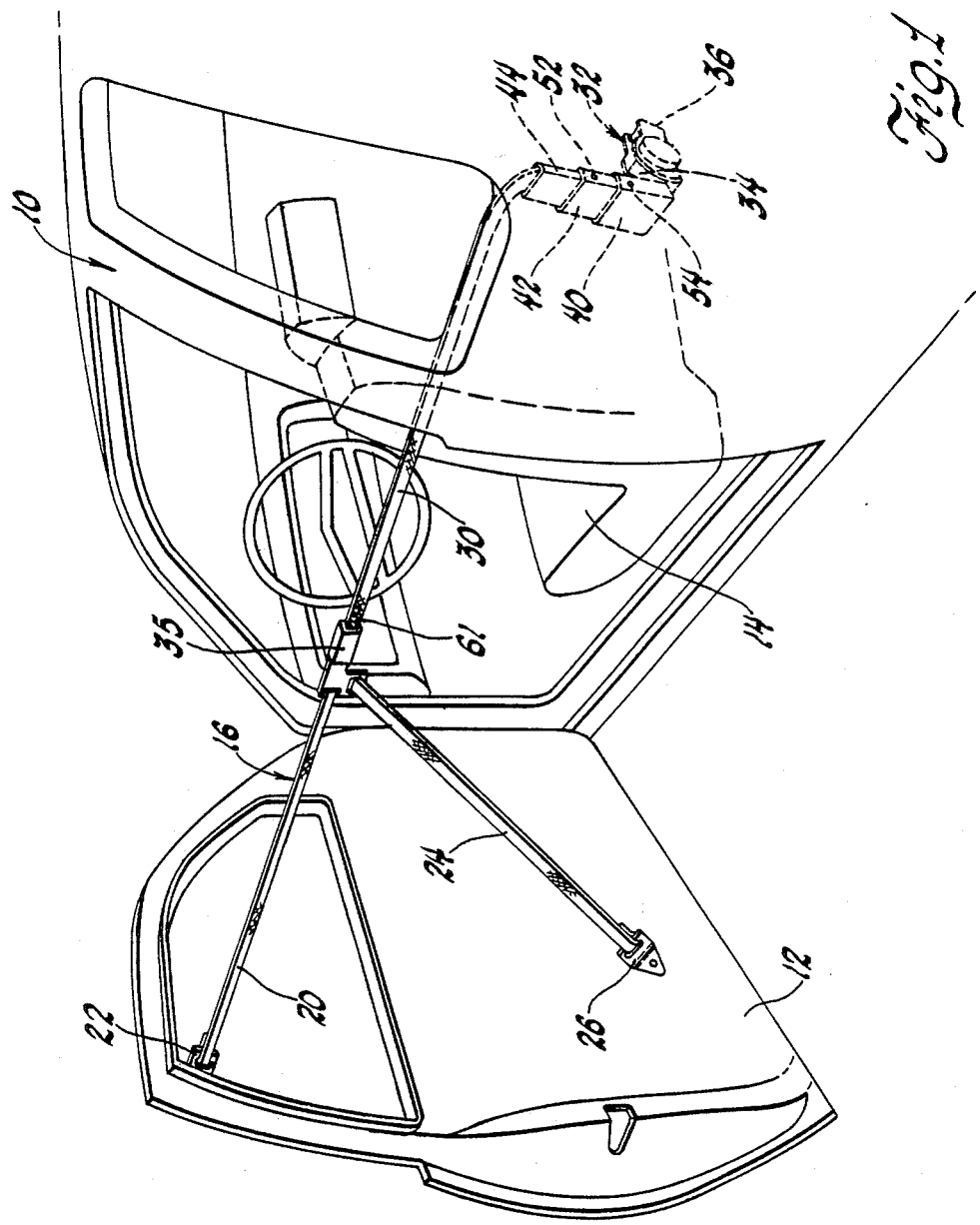
FIG. 1 is a perspective view of a vehicle body having a passive seat belt system with the seat belt extender of this invention associated with an inboard mounted seat belt retractor.

FIG. 1 is a perspective view of a vehicle body 10 having a door 12 hingedly mounted for movement between an open position shown in FIG. 1 and a closed position. An occupant seat 14 is provided in the occupant compartment of the vehicle body 10. A passive restraint belt system generally indicated at 16 is provided for automatically restraining the occupant on the seat 14 in response to closing movement of the door. The passive seat belt system includes a shoulder belt 20 having an outboard end mounted on the upper rear corner of the door by a anchorage 22 and a lap belt 24 having an outboard end mounted on the lower rear corner of the door by an anchorage 26. The belt system also includes a control belt 30 having an inboard end which is retractably mounted by a retractor 32 and an outboard end which is connected with the inboard ends of the shoulder belt 20 and lap belt 24 by a release buckle 35.

FIG. 1 shows the door open with the control belt 30 unwound from the retractor 32 so that the shoulder belt 20 and lap belt 24 are moved outwardly and forwardly from the occupant and the occupant may enter the vehicle and sit upon the seat 14 by sliding underneath the control belt 30.

FIG. 1 also shows a seat belt extender according to the present invention for lifting the control belt 30 vertically upwardly above the seat 14 to further facilitate occupant ingress and egress. As best seen in FIG. 2, the seat belt retractor 32 includes a reel 34 which is rotatably mounted on housing 36 and biased by a spring in a direction to retract and wind the control belt 30. A plurality of tubular telescoping sleeve members of molded plastic are mounted on the retractor. The extender includes a lower sleeve 40, an intermediate sleeve 42, and an endmost sleeve 44. The lower sleeve 40 is suitably connected to the retractor 32 and has a central passage 46 which slidably receives the intermediate sleeve 42. The intermediate sleeve 42 in turn has a central passage 48 which slidably receives the endmost sleeve 44.

FIG. 2 shows the sleeves in their relative extended positions. The sleeves are held in their extended positions by detents which act between the adjacent sleeves. For example, sleeve 44 has an integrally molded detent structure in the form of an integrally molded detent button 50 which interfits with a mating integrally molded structure on the sleeve 42 in the form of integrally molded depression 52. A similar detent 54 is provided between the base sleeve 40 and the intermediate sleeve 42.

When the belt 30 is rewound on the reel the buckle 34 engages the lip 58 of the sleeve 44 and the winding effort of the reel 34 acts to overcome the detent action between the projection 50 and the depression 52 to enable retraction of the endmost sleeve 44 into the intermediate sleeve 42. Likewise, when the lip 58 engages with the end of the intermediate sleeve 42, the continuing winding effort of the reel 34 acts to overcome the detent 54 between the intermediate sleeve 42 and the base sleeve 40 to permit the intermediate sleeve 42 to retract within the base sleeve 40. Accordingly, it will be understood that the retraction of the seat belt extender assembly allows the control belt 30 to fully retract and effectively lower the lap belt 24 onto the lap of the seated occupant.

Referring again to FIG. 2, it is seen that a hook and loop fastener assembly acts between the endmost sleeve 44 and the control belt 30. The strip 61 carries loops 62 and is sewn on the belt 30. A strip 65 carries hooks 64 and is sewn or glued on the endmost sleeve 44. When the control belt 30 is fully retracted with respect to the endmost sleeve 44, the loops 62 carried by the belt 30 are engaged by the hooks 64 carried on the endmost sleeve 44. Accordingly, as the door is opened and control belt 30 is extended from the retractor 32, the engagement of the loop 62 with hooks 64 cause the endmost sleeve 44 to be extended with the belt. The extending movement of the endmost sleeve 44 continues until the detent projection 50 of the endmost sleeve 44 engages with the detent recess 52 of the intermediate sleeve 42. Upon such engagement of the detent, the further unwinding movement of the belt 30 will extend the intermediate sleeve 42 from the base sleeve 40. Such extension of the seat belt extender continues until the intermediate sleeve 42 is fully extended and the detent 54 engaged. When the seat belt extender reaches its fully extended position, the further extension of the control belt 30 causes the loops 62 to separate from the hooks 64 to permit further extension of the control belt 30 to the full door open position of FIG. 1. The sleeves are tapered so that they cannot be extended beyond their extended positions of FIG. 2.

DESCRIPTION OF THE SECOND EMBODIMENT OF THE INVENTION

FIG. 3 shows an alternate construction of the detent acting between the sleeves and the detent acting between the control belt and the endmost sleeve. The seat belt extender in FIG. 3 includes a base sleeve 64, an intermediate sleeve 66 slidably engaged within the base sleeve 64, and an endmost sleeve 68 slidably received within the intermediate sleeve 66.

The detent mechanism acting between the endmost sleeve 68 and the intermediate sleeve 66 is comprised of spring detent clip 72 which is riveted to the endmost sleeve 68 and seats within a slot 74 provided in the intermediate sleeve 66. Likewise, a spring detent clip 76 is riveted to the intermediate sleeve 66 and seats within a slot 78 provided in the base sleeve 64.

When the belt 30 is rewound on the reel, the buckle engages the lip 80 of the endmost sleeve 68 and the winding effort of the reel 34 acts to overcome the detent action between the spring detent clip 72 and the slot 74 provided in the intermediate sleeve 66. The release may be obtained by either a flexure of the spring detent clip 76, or an inward flexure of the wall of the sleeve 68 upon which the spring detent clip 72 is mounted. As the winding of the belt progresses, the spring detent clip 76 is likewise disengaged from the slot 78 to permit full telescopic retraction of the sleeves 66 and 68 into the base sleeve 64.

Referring again to FIG. 3, it is seen that the control belt 30 carries a headed projection 86, preferably a plastic button, which snap fits into an integral depression 88 formed in the endmost sleeve 68 upon full winding and retraction of the control belt 30. Accordingly, when the belt is again unwound and extended from the reel 34, the engagement of the headed projection 86 in the depression 88 of the endmost sleeve 68, couples the belt to the sleeve so that the unwinding and extension of the belt causes the sleeve 68 to be extended and to in turn extend the intermediate sleeve 66.

It will be appreciated that the particular detent mechanisms shown in the drawings, for acting between the adjacent sleeves and between the belt and a the endmost sleeve, are merely exemplary of the types of detent which may be used in conjunction with applicant's invention as defined in the claims.

Thus it is seen that the invention provides a new and improved seat belt extender comprised of tubular telescoping sleeve members having a belt passing therethrough and wherein unwinding passage of the belt through the sleeves acts to extend the telescoping members to extended positions relative one another to lift the belt relative to the seated occupant.

The embodiments of the invention in which an exclusive property or privilege is claimed are defined as follow:

1. A seat belt extender for positioning a seat belt being unwound from a seat belt retractor, comprising:
    at least a pair of sleeves telescopably slidable relative one another between retracted and extended positions and having belt passages through which the belt passes from the retractor toward the occupant, said sleeves having means acting therebetween by which extension of the endmost of the sleeves causes progressive extension of each of the other sleeves;
    and detent means acting between the belt and the endmost of the sleeves to releasably couple the belt and the endmost of the sleeves so that unwinding and extension of the belt from the retractor causes the belt to carry the endmost sleeve therewith and thereby extend the other sleeves to their extended positions so that the sleeves support the belt at an extended position relative to the occupant, and said detent means releasing the belt from the endmost sleeve upon further extension of the belt.

2. A seat belt extender according to claim 1 in which the detent means is comprised of separable hook and loop type fastener elements provided respectively on the belt and on the endmost sleeve.

3. A seat belt extender according to claim 1 in which the detent means is comprised of a projecting element carried by the belt and engageable with an integral yieldable structure formed on the sleeve and engageable by the projecting element so that the projecting element carries the endmost sleeve to the extended position upon extension of the belt and then the integral yieldable structure yields the permit further unwinding of the belt from the retractor.

4. A seat belt extender for positioning a seat belt being unwound from a seat belt retractor, comprising:
    plurality of tubular telescoping members slidably telescoped together, each having a central colinear belt passageway having the belt passing therethrough from the retractor to reach toward an occupant;
    first detent means acting between the telescoping members to retain the telescoping members at an extended position relative one another and releasable to permit the telescoping members to retract relative one another;

and second detent means acting between the belt and the endmost of the telescoping members, said second detent member acting to releasably couple the belt and the endmost of the telescoping members so that unwinding of the belt from the retractor causes the belt to carry the endmost telescoping member therewith and thereby extend the plurality of telescoping members to their extended positions; said second detent releasing upon further unwinding of the belt beyond the range of extension of the telescoping members so that as belt unwinding progresses the telescoping members remain extended relative one another by the action of the first detent means.

5. A seat belt extender according to claim 4 in which the first detent means is comprised of interfitting integral elements carried by the adjacent telescoping members and engageable with one another to retain the telescoping members at an extended position relative one another and releasable from one another to permit the telescoping members to retract relative one another to permit retraction of the telescoping members upon retraction of the belt by the retractor.

6. A seat belt extender according to claim 4 in which the first detent means is comprised of a detent latch mounted on one of the telescoping members and a integral structural element formed on the adjacent of the telescoping members, said detent latch being engageable with the integral structural element to retain the telescoping members at an extended position relative one another and releasable from one another to permit the telescoping members to retract relative one another to permit retraction of the telescoping members upon retraction of the belt by the retractor.

* * * * *